April 1, 1930. W. C. STEWART 1,752,708
DIFFERENTIAL MOTION FOR ROVING FRAMES AND THE LIKE
Filed Sept. 6, 1929 3 Sheets-Sheet 1
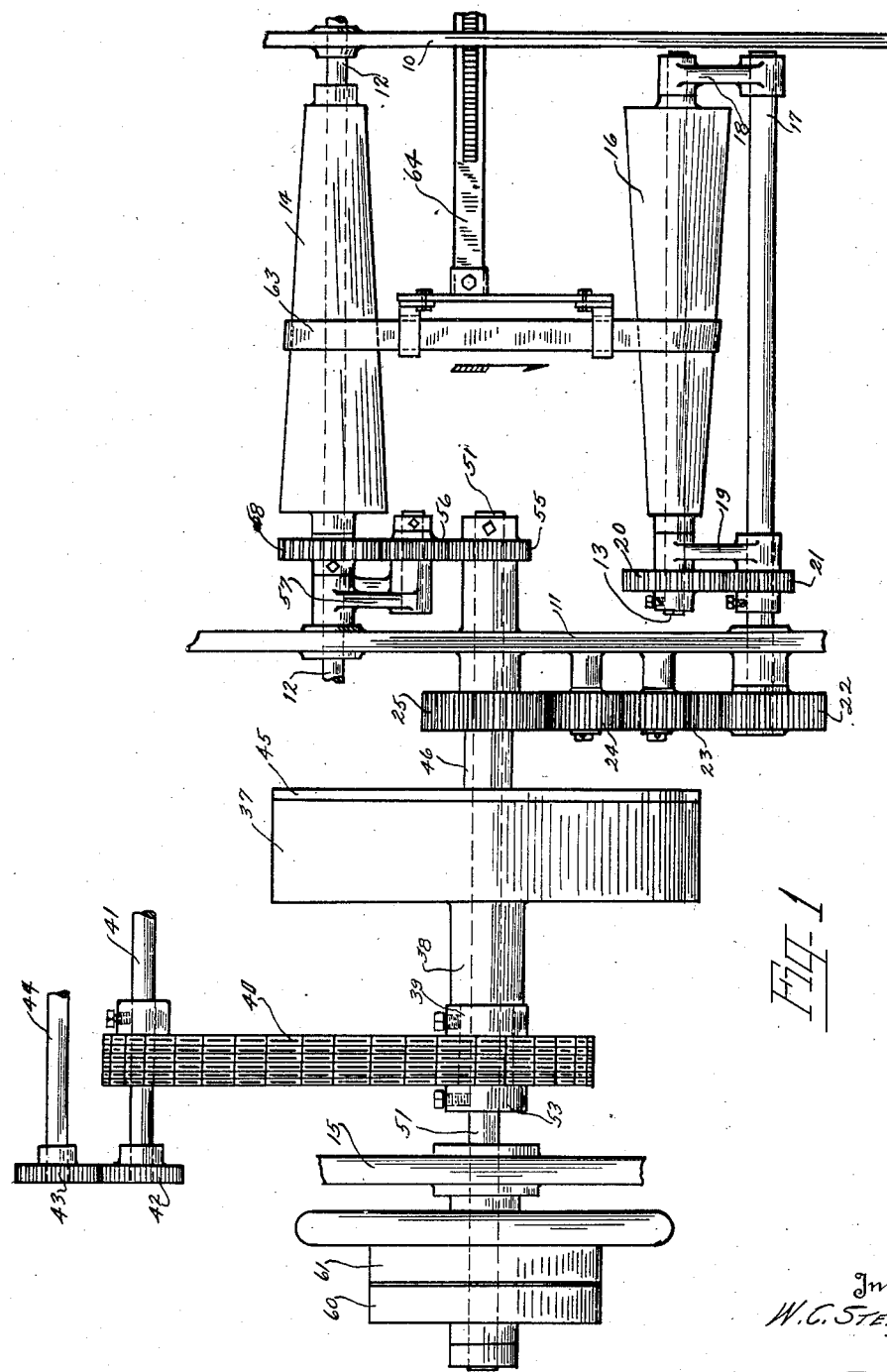

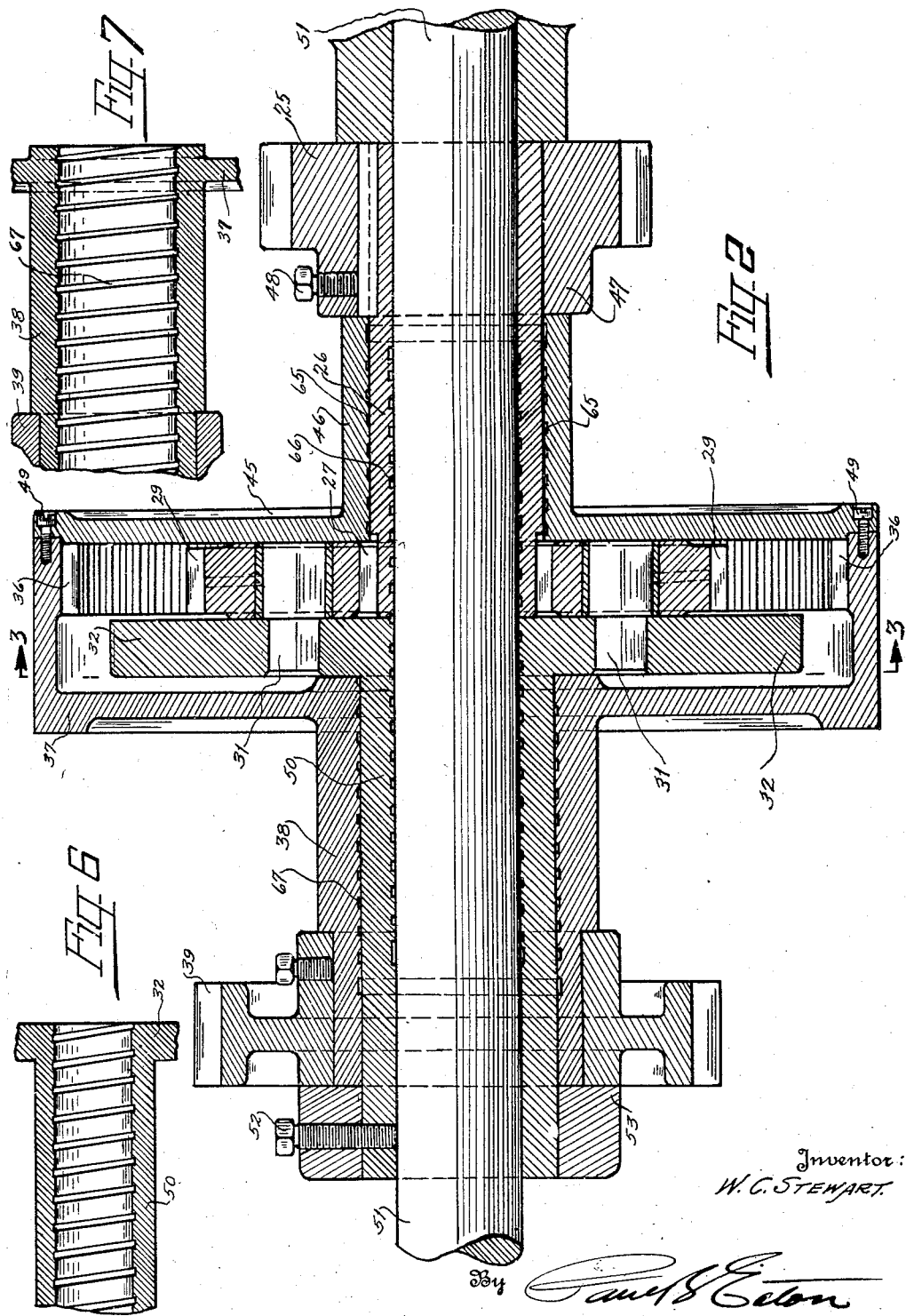

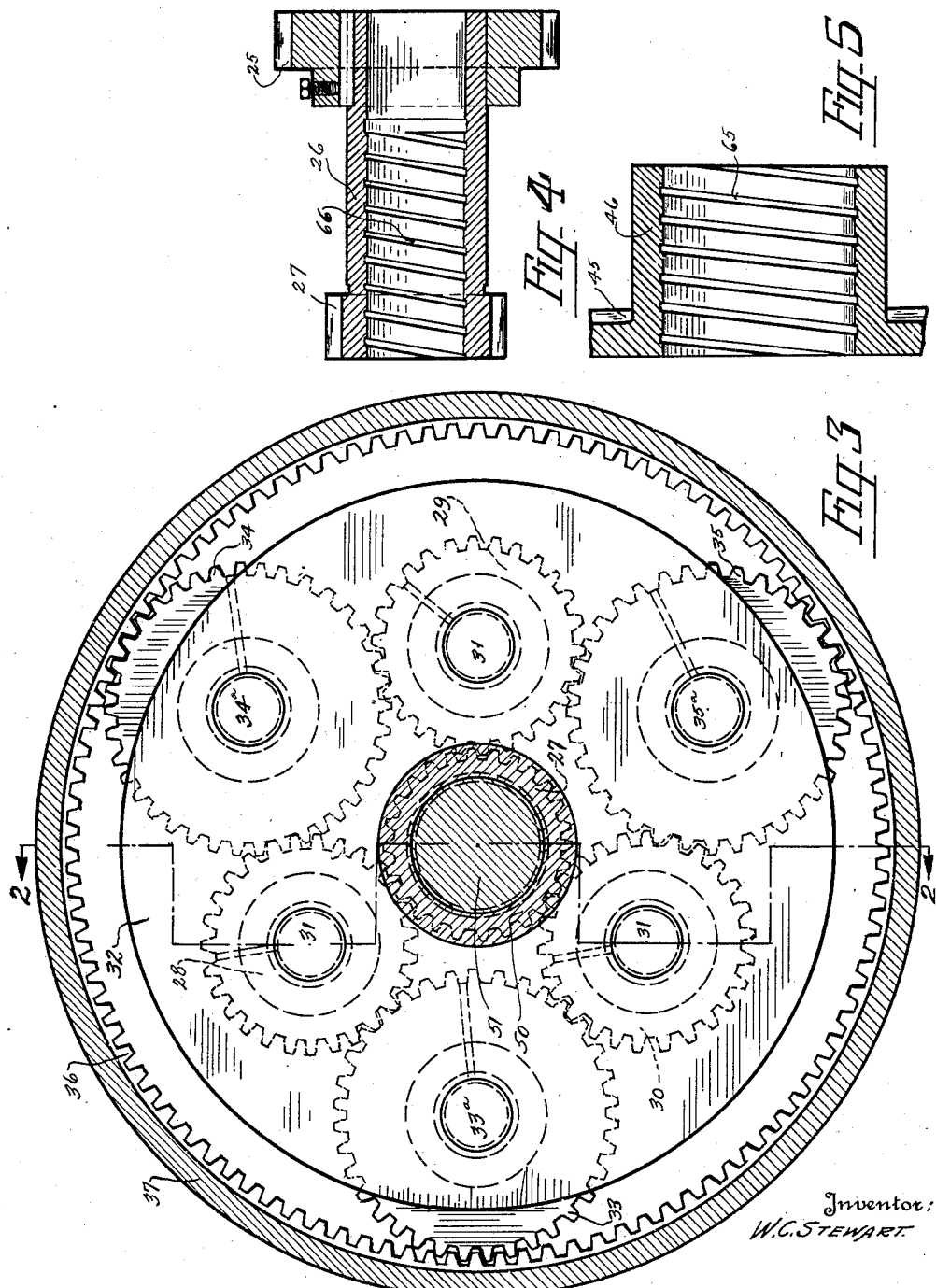

Patented Apr. 1, 1930

1,752,708

UNITED STATES PATENT OFFICE

WALTER C. STEWART, OF GASTONIA, NORTH CAROLINA, ASSIGNOR TO EMANUEL FROHMAN, OF GASTONIA, NORTH CAROLINA

DIFFERENTIAL MOTION FOR ROVING FRAMES AND THE LIKE

Application filed September 6, 1929. Serial No. 390,785.

My invention relates to a differential motion for roving frames and the like, in which I have devised a special differential motion for a special type of roving frames.

An object of my invention is to provide a differential motion for roving frames and the like, in which all parts move in the same direction but at different speeds to produce a proper differential in the roving frame, and the driving of the parts of the roving frame and the bobbin shafts which form a part of the roving frame.

Another object of my invention is to provide a differential motion for roving frames by means of which the desired speed may be imparted to the bobbin shafts with the minimum amount of loss of energy in accomplishing this result.

Another object of my invention is to provide a differential motion for roving frames, in which all of the moving parts move in the same direction at different speeds so as to procure the proper speed for the bobbin shafts with the minimum amount of power being wasted in obtaining the result.

Another object of my invention is to provide a differential motion for roving frames, in which all of the moving parts move in the same direction at different speeds so as to procure the proper speed for the bobbin shafts with the minimum amount of power being wasted in obtaining this result, together with means for lubricating the various parts of the machine and retaining the lubricant within the differential housing while the same is being operated.

Another object of my invention is to provide a differential motion for roving frames having means for retaining the lubricant therein but allowing air to escape therefrom.

It is a well known fact that when a lubricant is placed in a differential motion for roving frames with the parts therein moving at relatively high speeds that the lubricant becomes to a certain extent emulsified, and heretofore it has been impossible to procure a type of mechanism which would retain the lubricant within the gear casing, but would throw the lubricant all around the machine and soil the floors and also throw the lubricant onto the textile material which is being operated in the factory to the great damage of that textile.

I have provided in my differential motion for roving frames and the like a motion which is free to move and which has the minimum amount of friction and also which retains the lubricant therein.

Some of the objects of my invention having been stated other objects will appear as the description proceeds, when taken in connection with the accompanying drawings, in which—

Figure 1 is a side elevation of one end of a roving frame showing my invention as applied thereto;

Figure 2 is a longitudinal cross-sectional view taken through my differential motion for roving frames and the like, and is taken along the line 2—2 in Figure 3;

Figure 3 is a cross-sectional view taken along the line 3—3 in Figure 2;

Figure 4 is a longitudinal cross-sectional view showing one-half of the sleeve member 26;

Figure 5 is a longitudinal cross-sectional view of a portion of the cover portion 45 and the sleeve 46;

Figure 6 is a longitudinal cross-sectional view of a portion of the sleeve 50 and the disk 32;

Figure 7 is a longitudinal cross-sectional view showing a portion of the sleeve 38 and the casing 37 and the gear 39.

Referring more specifically to the drawings the numeral 10 indicates a support for the cone pulleys in a roving frame, and the reference character 11 indicates a support for the other end of the pulleys. These cone pulleys are mounted on the shafts 12 and 13, the shaft 12 having thereon the cone pulley 14 which is supported at one end by the member 10 and at the other end by the member 11, and this shaft extends into the head end of the frame which is designated by the reference character 15, and there has the gear for driving the front rolls, said gear not being shown but being behind or inside the member 15.

The cone pulley 16 is mounted on the shaft 13, and below the shaft 13 is the shaft 17 which has the arms 18 and 19 thereon, and in the free ends of these arms the shaft 13 is mounted on which the cone pulley 16 is fixedly scured. The end of the shaft 13 has secured thereon the gear 20 which meshes with the gear 21 on shaft 17 and on the end of shaft 17 is mounted the gear 22 which said gear 22 meshing with gear 23 which gear in turn meshes with another outer gear 24, and the gear 24 meshes with the gear 25 which is fixedly secured on the sleeve 26 carrying the spur gear 27. This spur gear 27 meshes with a plurality of pinions 28, 29 and 30 mounted on suitable pins, such as 31 on the disk 32 and also on this disk 32 are three larger pinions 33, 34 and 35, said outer pinions being adapted to mesh with the internal gear 36 on the shell 37 said shell having a sleeve portion 38 which extends outwardly and has mounted thereon the gear 39 on which a chain belt or other suitable driving mechanism 40 is mounted, and the other end of this chain belt 40 is secured on the bobbin shaft 41 which in turn has secured thereon the gear 42 which meshes with the gear 43 on the other bobbin shaft 44. The pinions 28, 29 and 30 not only mesh with the spur gear 27 but also mesh with the large pinions 33, 34 and 35.

The shell 37 that has the internal gear 36 on the inside thereof has the cover portion 45, which has the sleeve portion 46 integral therewith, covering the sleeve portion 26. This cover portion 45 is adapted to be secured to shell portion 37 by means of suitable screws 49. The gear 25 has the enlarged portion 47 with the set screw 48 therein by means of which the gear 25 is secured to the sleeve 26.

The disk 32 has the sleeve portion 50 which is fixedly secured to the shaft 51 by means of the set screws 52 which penetrates the enlarged portion 53 on the sleeve 50. This shaft 51 is known as the main driving shaft.

The main driving shaft 51 has secured thereon the spur gear 55, which is adapted to mesh with the idling gear 56 which is mounted on the pivotally mounted arm 57, which is adapted to swing on the shaft 12 and this gear 56 is adapted to mesh with the gear 58 which is fixedly secured on shaft 12.

The main drive shaft 51 has secured thereon the split pulleys 60 and 61 by means of which movement is imparted to the shaft 51 from that end as well as from the end nearest the cone pulley through the gears 22 to 25 inclusive.

The cone pulleys have mounted thereon the belt 63 which is adjusted in position by means of the belt rack 64 which is conventional in roving frames.

The sleeve portion 46 has a plurality of spirally disposed grooves 65 therein, which are adapted to feed the lubricant contained within the housing back into the housing and to prevent its escape therefrom. The inside of the sleeve 26 likewise has a spiral groove 66 extending its entire distance which also is adapted to feed the lubricant back into the casing.

The sleeve portion 38 also has spirally disposed grooves 67 therein which serve to feed the oil back into the casing, and preventing its escape therefrom.

The sleeve portion 50 likewise has the spirally disposed groove therein which acts to form recesses to prevent the escape of oil as there is no movement between sleeve 50 and the shaft 51.

The pinions 33, 34 and 35 are rotatably mounted on the pins 33$^a$, 34$^a$ and 35$^a$, which are secured in the disk 32 in the same manner as pin 31.

The method of operation of the differential motion is as follows:

The drive shaft 51 is partially driven by a suitable source of power, this drive shaft 51 has the sleeve 50 and the disk 32 fixedly secured thereon to rotate therewith. The pinions 33, 34 and 35 which are mounted on the disk 32 mesh with the internal gear 36 in the shell 37, and also mesh with the smaller pinions 28, 29 and 30. The rotation of disk 32 with drive shaft 31 and the meshing of the pinions with the internal gear 36 has a tendency to move the shell 37 on which is mounted the gear 39 at a certain speed, and at the same time the gear 25 which is fixedly mounted on sleeve 26 is driven by the cone pulleys 14 and 15 through the mechanism which has been described, and this turns the spur gear 27 which is integral with sleeve 26 and which spur gear meshes with the pinions 28, 29 and 30, and causes these pinions to move in the same direction in which they are already moving, and this means that all parts in the mechanism are moving in the same direction, but owing to the fact that we have two sources of driving power, namely the shaft 51 and the gear 26 the difference in speed of the two driving mechanisms give a resultant to the gear 39, and this resultant is the result of the difference in speed between the cone pulley mechanism and the drive shaft 51, and it might be added that the speed of the cone pulley is regulated by the cone rack 64 controlling the position of cone belt 63 on the cone pulleys 14 and 16.

In the drawings and specification I have set forth a preferred embodiment of my invention, and although specific terms are employed, they are used in a generic and descriptive sense only, and not for purposes of limitation, the scope of the invention being set forth in the appended claims.

I claim:

1. In a differential motion for roving frames and the like, the drive shaft, a sleeve fixedly secured on said drive shaft and having a disk integral therewith, a second sleeve rotatably mounted on the first sleeve and having a housing integral therewith, a gear wheel on said second sleeve, a cover member adapted to be secured to the said housing, a sleeve portion integral with said cover member, a fourth sleeve member slidably mounted on the shaft and projecting into the gear housing through the sleeve which is integral with the cover member, a gear secured on the said fourth sleeve, a plurality of pinions mounted on the disk secured to the said second sleeve, said pinions being adapted to mesh with the spur gear on the fourth sleeve, an internal gear in said housing, a plurality of other pinions mounted on the disk which is integral with the second sleeve, said pinions being adapted to mesh with said internal gear and also mesh with the first named pinions mounted on said disk, a driving connection between the gear mounted on the said fourth sleeve and the cone pulleys of a roving frame, and the drive shaft being adapted to be connected to a source of power.

2. In a differential motion for roving frames and the like, a main drive shaft, a sleeve freely mounted on said drive shaft and having gear thereon, said gear being adapted to be connected to the cone pulleys on a roving frame, a spur gear on said sleeve, a second sleeve mounted on said first sleeve and having a disk member integral therewith, a third sleeve mounted on the said drive shaft and having a disk integral therewith on which a plurality of pinions are mounted, a portion of said pinions being adapted to mesh with the spur gear, a plurality of other pinions mounted on said last mentioned disk, a housing fixedly secured to the disk on the second sleeve, an internal gear in said housing with which the last named pinions are adapted to mesh, said last named pinions being also adapted to mesh with the pinions which mesh with the spur gear, said housing having a sleeve integral therewith, a gear on said last mentioned sleeve, said last named gear being adapted to be suitably connected to the bobbin shaft of a roving frame.

3. In a differential motion for roving frames and the like, a drive shaft, a housing, a sleeve integral with said housing and having a gear fixedly secured thereon with suitable driving connections between said gear and the bobbin shaft of a roving frame, a spur gear on said sleeve, a cover for said housing, a sleeve integral with said cover, another sleeve rotatably mounted on the drive shaft within the sleeve projecting from the cover member, a gear on the sleeve rotatably mounted on the drive shaft, gear connections between said gear and the cone pulleys of a roving frame, a sleeve fixedly secured to the drive shaft and having a disk integral therewith, a plurality of pinions mounted on said disk and being adapted to mesh with the spur gear, an internal gear in said housing, a plurality of other pinions mounted on said disk and being adapted to mesh with the first named pinions and also with the said internal gear.

4. In a differential motion for roving frames and the like, a housing, a sleeve mounted within the housing and having a disk supported by said sleeve within the housing, an internal gear in said housing, a sleeve and spur gear mounted within the housing and projecting outwardly from said housing, a gear mounted on the last named sleeve, a plurality of pinions mounted on the disk which is integral with one of the sleeves, a portion of said pinions being adapted to mesh both with the spur gear and other pinions, and the other pinions being adapted to mesh with the internal gear in the housing.

In testimony whereof I affix my signature.

WALTER C. STEWART.